(12) United States Patent
Ratajac et al.

(10) Patent No.: US 10,145,256 B2
(45) Date of Patent: Dec. 4, 2018

(54) AIRCRAFT PROPULSION SYSTEM SEAL ASSEMBLY WITH SPRING SEAL ELEMENT AND COMPLIANT SEAL ELEMENT

(71) Applicant: Rohr, Inc., Chula Vista, CA (US)

(72) Inventors: Aleksandar Ratajac, San Diego, CA (US); Michael Aten, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 15/488,935

(22) Filed: Apr. 17, 2017

(65) Prior Publication Data

US 2018/0298772 A1 Oct. 18, 2018

(51) Int. Cl.
| | |
|---|---|
| *F16J 15/06* | (2006.01) |
| *F01D 11/00* | (2006.01) |
| *F16J 15/00* | (2006.01) |
| *F16J 15/02* | (2006.01) |
| *F02C 7/28* | (2006.01) |

(52) U.S. Cl.
CPC .............. *F01D 11/003* (2013.01); *F02C 7/28* (2013.01); *F16J 15/002* (2013.01); *F16J 15/025* (2013.01); *F16J 15/027* (2013.01); *F05D 2240/55* (2013.01)

(58) Field of Classification Search
CPC ......... F01D 11/003; F02C 7/28; F16J 15/002; F16J 15/025; F16J 15/027; F05D 2240/55
See application file for complete search history.

(56) References Cited

U.S. PATENT DOCUMENTS

| | | | |
|---|---|---|---|
| 4,022,948 A * | 5/1977 | Smith | F02K 1/805 239/265.39 |
| 4,114,248 A | 9/1978 | Smith et al. | |
| 4,645,217 A * | 2/1987 | Honeycutt, Jr. | F01D 11/005 277/555 |
| 5,052,152 A | 10/1991 | Weddendorf | |
| 2002/0117806 A1* | 8/2002 | Grondahl | F16J 15/3292 277/355 |
| 2004/0150165 A1* | 8/2004 | Grondahl | F16J 15/3292 277/355 |
| 2008/0016871 A1* | 1/2008 | Lavin | F01D 11/005 60/766 |
| 2010/0007093 A1* | 1/2010 | Grondahl | F16J 15/3292 277/500 |
| 2014/0183825 A1* | 7/2014 | Chuong | F16J 15/0887 277/411 |
| 2015/0360795 A1 | 12/2015 | Livingston | |
| 2015/0367947 A1 | 12/2015 | Audart-Noel et al. | |
| 2016/0061328 A1 | 3/2016 | Ritoper et al. | |

* cited by examiner

*Primary Examiner* — Gilbert Y Lee
(74) *Attorney, Agent, or Firm* — O'Shea Getz P.C.

(57) ABSTRACT

An assembly is provided for an aircraft propulsion system. The assembly includes a first component, a second component and a seal assembly configured to seal a gap between the first and the second components. The seal assembly includes a metal spring seal element and an elastomeric seal element. The metal spring seal element is mounted to the first component. The metal spring seal element is sealingly engaged with the second component. The elastomeric seal element is mounted to the metal spring seal element. The elastomeric seal element is sealingly engaged with the second component.

18 Claims, 4 Drawing Sheets

AIRCRAFT PROPULSION SYSTEM SEAL ASSEMBLY WITH SPRING SEAL ELEMENT AND COMPLIANT SEAL ELEMENT

BACKGROUND

1. Technical Field

This disclosure relates generally to an aircraft propulsion system and, more particularly, to a seal assembly for sealing a gap between, for example, a nacelle structure and a pylon structure.

2. Background Information

Various types and configurations of seal elements are known in the art and used for sealing gaps between components of an aircraft propulsion system. One known seal element is an elastomeric seal element such as a bulb seal element. While an elastomeric seal element can provide a relatively fluid tight seal, the elastomeric seal material may degrade quickly upon being subjected to a high temperature environment. Another known seal element is a metal spring seal element. While the metal of a metal spring seal element can withstand a relatively high temperature environment, such a spring seal element typically provides a less fluid tight seal than an elastomeric seal element.

There is need in the art for a seal assembly that can withstand a relatively high temperature environment while also providing a relatively fluid tight seal.

SUMMARY OF THE DISCLOSURE

According to an aspect of the present disclosure, an assembly is provided for an aircraft propulsion system. This assembly includes a first component of the aircraft propulsion system, a second component of the aircraft propulsion system, and a seal assembly configured to seal a gap between the first component and the second component. The seal assembly includes a metal spring seal element and an elastomeric seal element. The metal spring seal element is mounted to the first component. The metal spring seal element is sealingly engaged with the second component. The elastomeric seal element is mounted to the metal spring seal element. The elastomeric seal element is sealingly engaged with the second component.

According to another aspect of the present disclosure, another assembly is provided for an aircraft propulsion system. This assembly includes a first component of the aircraft propulsion system, a second component of the aircraft propulsion system, and a seal assembly configured to seal a gap defined by and extending between the first component and the second component. The seal assembly includes a spring seal element and a bulb seal element. The spring seal element is attached to the first component. The spring seal element sealingly contacts the second component. The bulb seal element is attached to the spring seal element. The bulb seal element sealingly contacts the second component.

According to still another aspect of the present disclosure, a seal assembly is provided for sealing a gap formed by and extending between first and second components of an aircraft propulsion system. The seal assembly includes a metal spring seal element and an elastomeric bulb seal element. The metal spring seal element includes a first portion and a second portion. The first portion is configured to mount to the first component. The second portion is configured to sealingly contact the second component. The elastomeric bulb seal element is mounted to the first portion and configured to sealingly contact and be compressed against the second component. The metal spring seal element is configured as a turkey feather seal element.

A first portion of the metal spring seal element may be mounted to the first component. A second portion of the metal spring seal element may be sealingly engaged with the second component. The elastomeric seal element may be mounted to the first portion of the metal spring element.

The second portion of the metal spring element may be cantilevered from the first portion of the metal spring element.

The metal spring element may be configured as or otherwise include a feathered spring element body.

The metal spring element may include a second feather spring element body. Slots in the feathered spring element body may be offset from slots in the second feather spring element body.

The metal spring element may include a distal end portion with an arcuate sectional geometry. A convex surface of the distal end portion may sealingly contact the second component.

The seal assembly may include a retainer mounting the elastomeric seal element to the metal spring element.

The retainer may have a generally C-shaped sectional geometry.

The elastomeric seal element may be configured as or otherwise include a bulb seal element.

The elastomeric seal element may include a tubular portion that elastically deforms when engaging the second component.

The first component may be configured as or otherwise include an inner fixed structure of a nacelle for the aircraft propulsion system. The second component may be configured as or otherwise include a pylon structure for the aircraft propulsion system.

A thermal insulator may be included and disposed between the metal spring element and the elastomeric seal element.

The spring seal element may be configured from or otherwise include metal.

The bulb seal element may be configured from or otherwise include elastomeric polymer.

The spring seal element may be configured within the gap as a heat shield for the bulb seal element.

The spring seal element may include a plurality of stacked feathered spring element bodies.

The foregoing features and the operation of the invention will become more apparent in light of the following description and the accompanying drawings.

DETAILED DESCRIPTION

Figure 1:
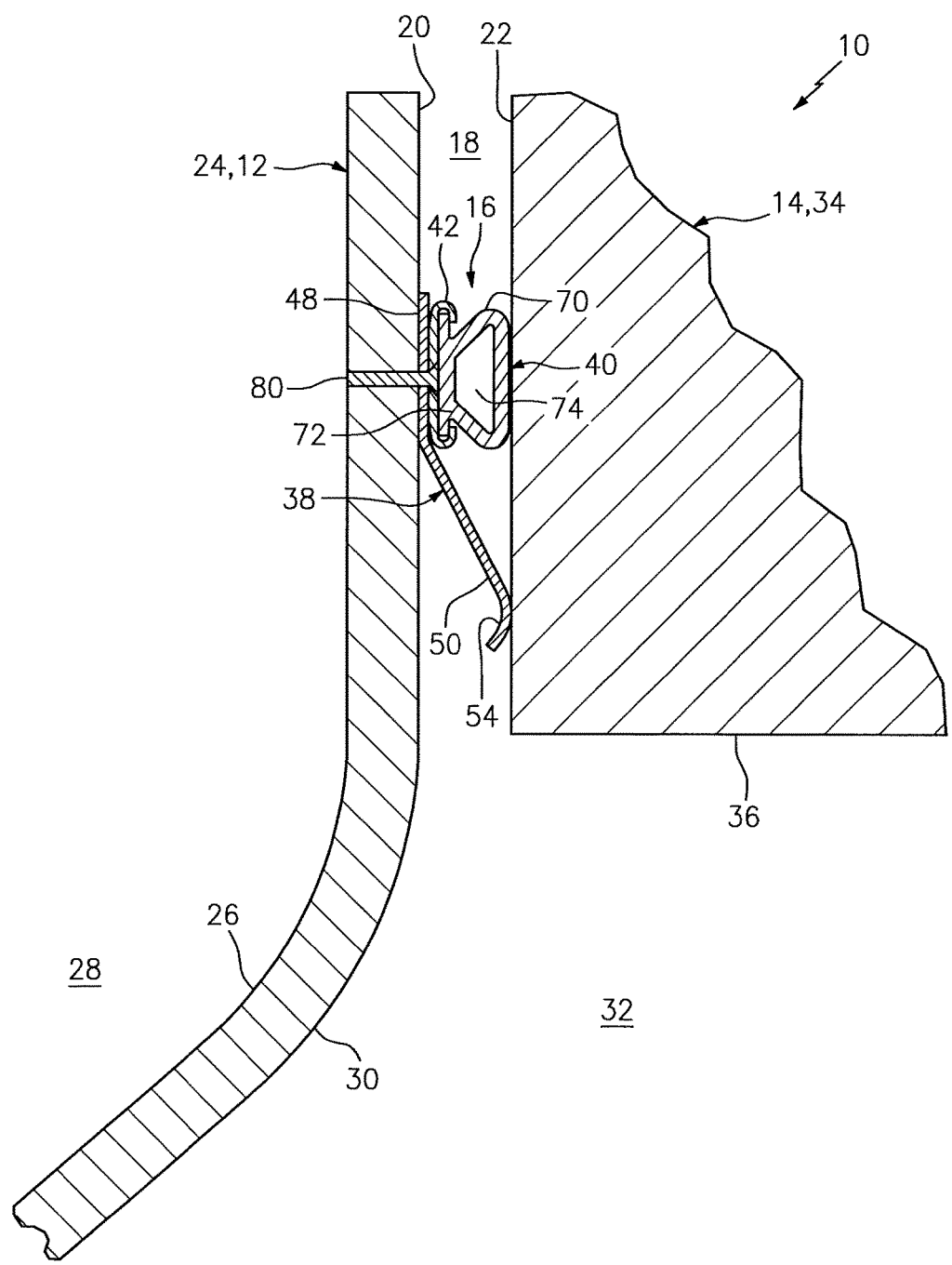
FIG. 1 is a sectional illustration of a seal assembly sealing a gap between first and second components.

FIG. 1 illustrates an assembly 10 for an aircraft propulsion system for an aircraft such as, but not limited to, a commercial airliner. The propulsion system assembly 10 includes a first component 12 of the aircraft propulsion system and a second component 14 of the aircraft propulsion system. The propulsion system assembly 10 also includes a seal assembly 16 configured to seal a gap 18 defined by and extending laterally between a surface 20 of the first component 12 and a laterally opposed surface 22 of the second component 14.

The first component 12 may be configured as an inner fixed structure 24 (also referred to as an "IFS") of a nacelle for the aircraft propulsion system. The portion of the first component 12 illustrated in FIG. 1, for example, is configured as a radially outer distal end of a bifurcation portion of the inner fixed structure 24. With such a configuration, an exterior side 26 of the first component 12 may partially form an inner periphery of a bypass flow path 28 within the aircraft propulsion system. An interior side 30 of the first component 12 may partially form an outer periphery of a core compartment 32 in which a gas turbine engine core (e.g., a compressor, a combustor and a turbine) of the aircraft propulsion system may be located. The present disclosure, however, is not limited to such an exemplary first component configuration.

The second component 14 may be configured as a pylon structure 34 for the aircraft propulsion system. This pylon structure 34 mounts the aircraft propulsion system to the aircraft; e.g., a wing or fuselage of the aircraft. With such a configuration, a radial inner side 36 of the pylon structure 34 may also partially form the outer periphery of the core compartment 32. The present disclosure, however, is not limited to such an exemplary second component configuration.

Figure 2:
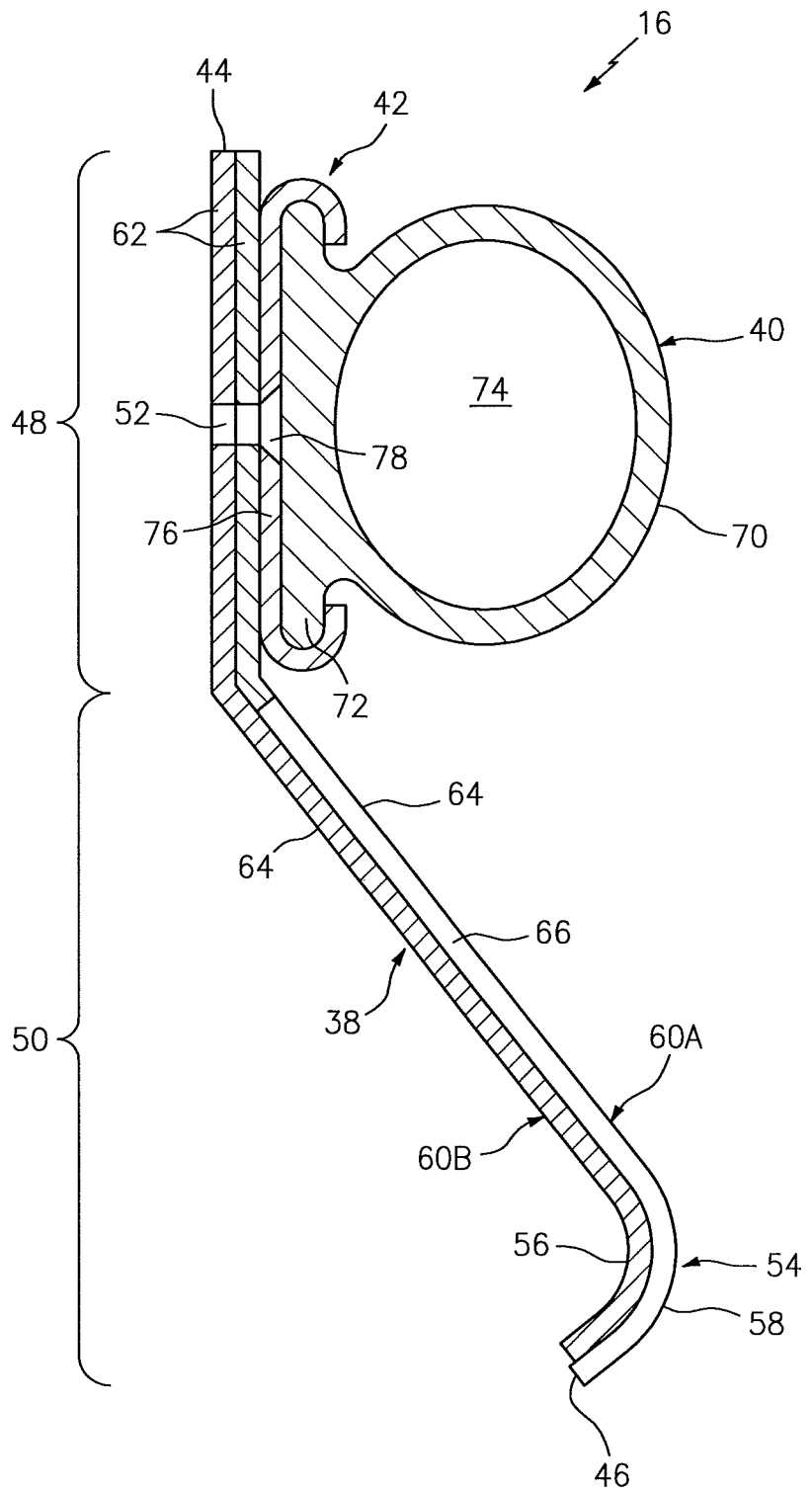
FIG. 2 is a sectional illustration of the seal assembly take along line 2-2 in FIG. 3.
Figure 3:
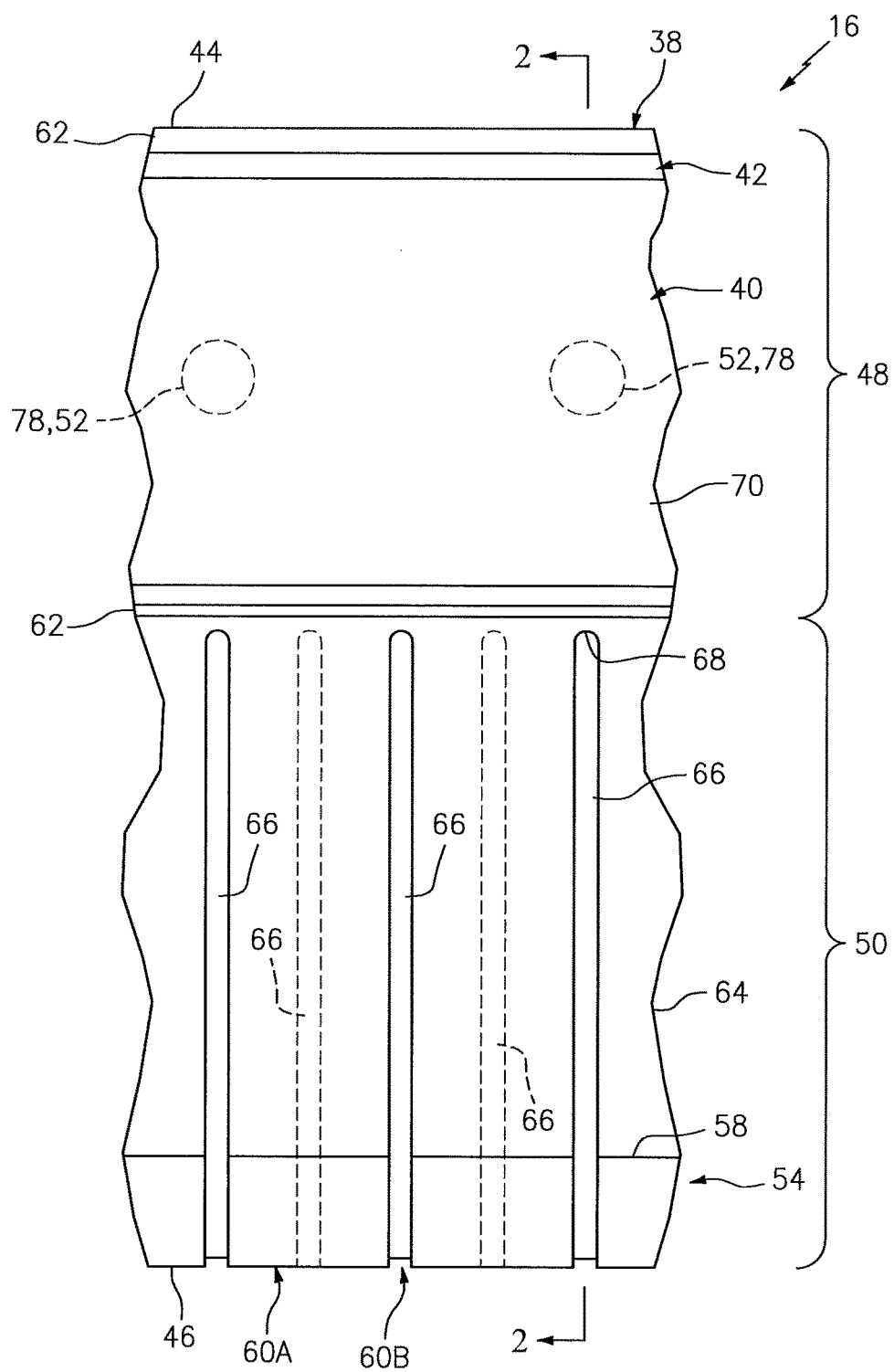
FIG. 3 is a side view of the seal assembly.
Figure 4:
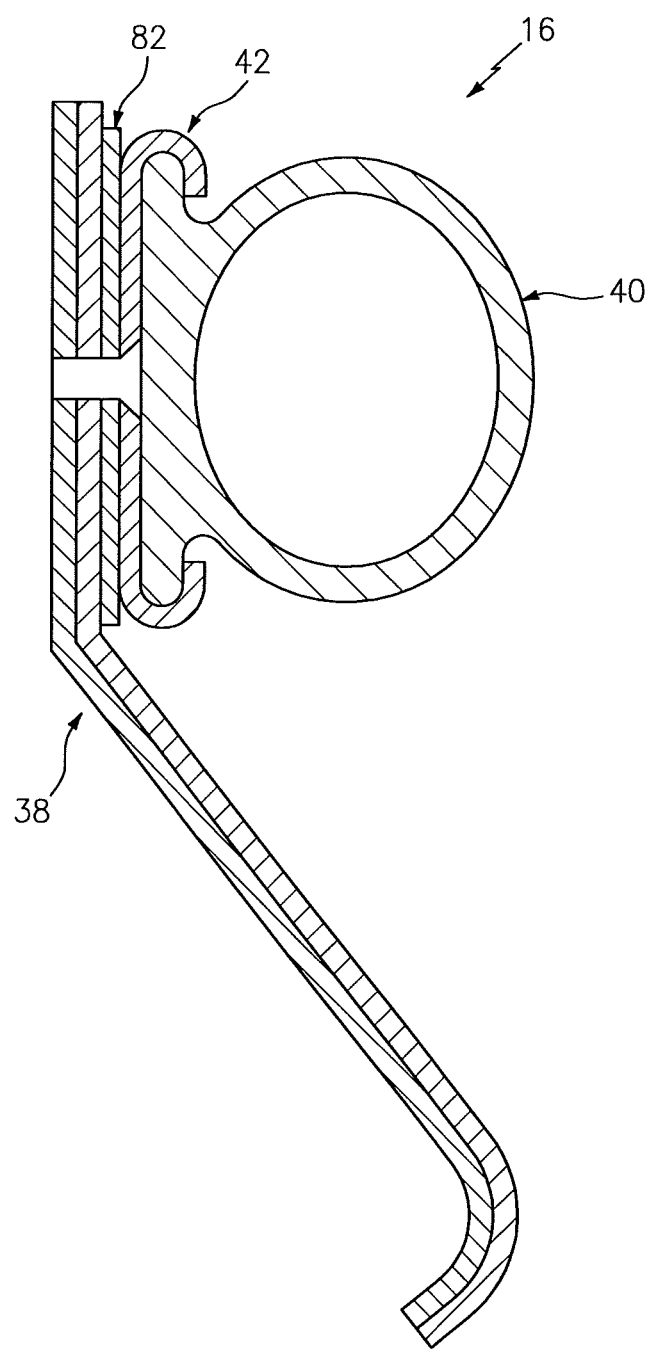
FIG. 4 is a sectional illustration of another seal assembly.

Referring to FIGS. 2 and 3, the seal assembly 16 includes a spring seal element 38, a compliant seal element 40 and a retainer 42. The spring seal element 38 extends vertically between a vertical first (e.g., radial outer) end 44 and a vertical second (e.g., radial inner) end 46; see FIG. 2. The spring seal element 38 extends longitudinally between opposing longitudinal sides (not shown); see FIG. 3.

The spring seal element 38 includes a mount 48 and a cantilevered spring arm 50. The mount 48 may have a substantially flat and linear sectional geometry as shown in FIG. 2. In such an embodiment, the mount 48 may be substantially sheet-like or planar. The mount 48 of FIGS. 2 and 3 includes one or more fastener apertures 52, which extend laterally through the mount 48.

The spring arm 50 projects diagonally (e.g., vertically downwards and laterally to the right in FIG. 2) out from the mount 48 to a distal end portion 54 thereof This distal end portion 54 may have an arcuate or otherwise curved sectional geometry, which provides a first lateral side 56 of the end portion 54 with a concave surface and an opposite second lateral side 58 of the end portion 54 with a convex portion. The present disclosure, however, is not limited to such an exemplary spring seal element configuration. For example, in other embodiments, the distal end portion 54 may be canted from or aligned with an intermediate portion of the spring seal element 38.

The spring seal element 38 may be constructed from metal such as, but not limited to, Inconel 718. The spring seal element 38 of FIGS. 2 and 3 is configured as a turkey feather seal element. More particularly, the spring seal element 38 may be formed from one or more stacked plies of (e.g., metal) feathered spring element bodies 60A and 60B (generically referred to as "60").

Each feathered spring element body 60 includes a mounting portion 62 and an arm portion 64. The mounting portion 62 forms a respective ply of the mount 48 of the spring seal element 38. The arm portion 64 forms a respective ply of the spring aim 50 of the spring seal element 38. The arm portion 64 also includes one or more slots 66 arranged longitudinally along the feathered spring element body 60. Each of these slots 66 extends laterally through the feathered spring element body 60. Each of these slots 66 extends vertically into the arm portion 64 from the vertical second end 46 to a slot end 68, which may be located approximately at (e.g., on, adjacent or proximate) an intersection between the arm portion 64 and the mounting portion 62. While each of the feathered spring element bodies 60 includes the slots 66, the slots 66 are configured in the bodies 60 to be longitudinally offset from one another to seal direct leakage paths through the spring seal element 38. In other words, the first feather seal element body 60A overlaps the slots 66 in the second feather seal element body 60B and vice versa. The present disclosure, of course, is not limited to such an exemplary turkey feather seal element configuration. For example, in other embodiments, the slots 66 may have a different arrangement, lengths, etc. In some embodiments, the slots 66 may be omitted such that the seal element bodies 60 are not feathered. In some embodiments, the spring seal element 38 may be formed from more than two plies, or a single ply of material.

The compliant seal element 40 may be configured as a bulb seal element. The compliant seal element 40 of FIG. 2, for example, includes a tubular portion 70 and a mounting portion 72. The tubular portion 70 is laterally next to and connected to the mounting portion 72. The tubular portion 70 has an interior bore 74 that extends longitudinally within the compliant seal element 40. One or both ends of this bore 74 may be open or closed depending upon the application. The compliant seal element 40 may be formed as a monolithic body from an elastomeric material; e.g., elastomeric polymer. Examples of such an elastomeric material include, but are not limited to, silicon which may (or may not be) be reinforced with one or more plies of fiberglass, Nextel fibers and/or carbon fiber. The outer seal surface may (or may not be) protected against wear by Nomex of Polyester fabric. The present disclosure, however, is not limited to such an exemplary compliant seal element configuration. For example, in other embodiment, the seal element 40 may alternatively be configured as another type of compliant (e.g., elastomeric) gasketing.

The retainer 42 is configured to mount 48 the compliant seal element 40 to the spring seal element 38 and the first component 12 as described below in further detail. The retainer 42 of FIG. 2 has a generally channeled and C-shaped sectional geometry, which may extend longitudinally along a length thereof. An intermediate portion 76 of the retainer 42 includes one or more fastener apertures 78. The retainer 42 may be constructed from metal, relatively stiff polymer, composite or any other suitable material.

Referring again to FIG. 1, the retainer 42 and the spring seal element 38 are mounted to the first component 12 by one or more fasteners 80; e.g., rivets, bolts, etc. More particularly, the mount 48 is disposed laterally between the first component surface 20 and the retainer 42. The fasteners 80 are inserted through the fastener apertures 52 and 78 (see FIG. 2) in the mount 48 and the retainer 42 as well as through fastener apertures in the first component 12 to statically secure the retainer 42 and the spring seal element 38 to the first component 12. With this arrangement, the mount 48 of the spring seal element 38 sealingly engages (e.g., tightly pressed against and/or contacts) the first component surface 20. The compliant seal element 40 is subsequently mounted to the spring seal element 38. More particularly, the mounting portion 72 is configured (e.g., slid longitudinally) into the channel defined by the retainer 42.

Typically, the seal assembly components 38, 40 and 42 will be mounted with the first component 12 when the first component 12 is pulled away from the second component 14. For example, the inner fixed structure 24 may be configured with two halves (one partially shown in FIG. 1), where each half may be pivotally connected to the pylon structure 34 to provide access to the turbine engine core for service and inspection. With such a configuration, the seal assembly components 38, 40 and 42 may be mounted to the inner fixed structure 24 half (i.e., the first component 12) when that half is open.

After seal assembly components 38, 40 and 42 have been mounted, the inner fixed structure half (i.e., the first component 12) may be pivoted closed. As this half is being closed, the distal end portion 54 of the spring seal element 38 and the tubular portion 70 of the compliant seal element 40 engage (e.g., contact) and are pressed laterally against the second component surface 22. This in turn may cause the spring arm 50 to slightly deform (e.g., bend) laterally towards the first component 12. Due to the resilient nature of the spring seal element 38, this deformation may result in the distal end portion 54 being laterally biased against and, thus, sealing engaging (e.g., tightly pressing against and/or contacting) the second component surface 22. Thus, the spring seal element 38 provides a first seal between the first component 12 and the second component 14.

The closing of the inner fixed structure half (i.e., the first component 12) also may cause the tubular portion 70 to deform such that its lateral diameter shirks and its vertical diameter increases. Due to the elastomeric nature of the compliant seal element 40, this deformation may result in (1) the tubular portion 70 being laterally biased against and, thus, sealing engaging (e.g., tightly pressing against and/or contacting) the second component surface 22 and (2) the mounting portion 72 being laterally biased against and, thus, sealing engaging (e.g., tightly pressing against and/or contacting) the retainer 42. Thus, the compliant seal element 40 provides a second seal between the first component 12 and the second component 14.

During operation nominal operation, both the spring seal element 38 and the compliant seal element 40 provide respective seals between the first component 12 and the second component 14 as described above. In general, the compliant seal element 40 can provide a more fluid tight seal than the spring seal element 38 due to its material flexibility, etc. However, the compliant seal element 40 may be susceptible to damage when exposed to a relatively high temperature environment which can be generated within the core compartment 32. Therefore, the spring arm 50 of the spring seal element 38 is positioned vertically between the compliant seal element 40 and the core compartment 32. In this manner, in addition to providing a seal, the spring seal element 38 may operate as a heat shield for the compliant seal element 40.

During a failure event such as a fire within the core compartment 32, the spring seal element 38 may operate as a flame barrier for the compliant seal element 40 in addition to the functionalities described above.

During another failure event such as a duct burst event, the configuration of the spring seal element 38 may ensure maintenance of the seal between the first component 12 and the second component 14. For example, pressurized air within the core compartment 32 may subject a pressure force against the spring aim 50 thereby further pressing the spring arm 50 against the second component surface 22.

The components of the seal assembly 16 may have different configurations than the exemplary ones described above. For example, in some embodiments, the retainer 42 may be configured integrally with the spring seal element 38. In other embodiments, the compliant seal element 40 may be directly connected to the spring seal element 38, for example, using adhesive. In other embodiments, to reduce heat conduction between the spring seal element 38 and the compliant seal element 40, the seal assembly 16 may include a thermal insulator 82 separating the spring elements 38 and 40.

The terms "vertical", "lateral" and "longitudinal" are used above to provide a point of reference for the orientations of the assembly 10. However, these terms are not intended to limit the seal assembly 16 to being positioned in a particular orientation relative to gravity. For example, in other embodiments, the vertical direction may be a gravitational horizontal direction. In addition, the term "radial" is used to orientate the components described above relative to an axial centerline (e.g., a rotational axis) of the aircraft propulsion system. A person of skill in the art will recognize, of course, one or more of these components may be utilized in other orientations than those described above. The present invention therefore is not limited to any particular spatial orientations.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:

1. An assembly for an aircraft propulsion system, comprising:
   a first component of the aircraft propulsion system;
   a second component of the aircraft propulsion system; and
   a seal assembly configured to seal a gap between the first component and the second component, the seal assembly including a metal spring seal element and an elastomeric seal element;
   the metal spring seal element mounted to the first component, and sealingly engaged with the second component; and
   the elastomeric seal element mounted to the metal spring seal element, and sealingly engaged with the second component;
   wherein the elastomeric seal element comprises a tubular portion that elastically deforms when engaging the second component.

2. The assembly of claim 1, wherein
   a first portion of the metal spring seal element is mounted to the first component;
   a second portion of the metal spring seal element is sealingly engaged with the second component; and
   the elastomeric seal element is mounted to the first portion of the metal spring element.

3. The assembly of claim 2, wherein the second portion of the metal spring element is cantilevered from the first portion of the metal spring element.

4. The assembly of claim 1, wherein the metal spring element comprises a feathered spring element body.

5. The assembly of claim 4, wherein
   the metal spring element further comprises a second feather spring element body; and slots in the feathered spring element body are offset from slots in the second feather spring element body.

6. The assembly of claim 1, wherein
the metal spring element comprises a distal end portion with an arcuate sectional geometry; and
a convex surface of the distal end portion sealingly contacts the second component.

7. The assembly of claim 1, wherein the seal assembly further includes a retainer mounting the elastomeric seal element to the metal spring element.

8. The assembly of claim 7, wherein the retainer has a generally C-shaped sectional geometry.

9. The assembly of claim 1, wherein the elastomeric seal element comprises a bulb seal element.

10. The assembly of claim 1, wherein
the first component comprises an inner fixed structure of a nacelle for the aircraft propulsion system; and
the second component comprises a pylon structure for the aircraft propulsion system.

11. The assembly of claim 1, further comprising a thermal insulator between the metal spring element and the elastomeric seal element.

12. The assembly of claim 1, wherein the tubular portion is configured with a hollow inner bore.

13. An assembly for an aircraft propulsion system, comprising:
a first component of the aircraft propulsion system;
a second component of the aircraft propulsion system; and
a seal assembly configured to seal a gap defined by and extending between the first component and the second component, the seal assembly including a spring seal element and a bulb seal element with an unfilled inner bore;
the spring seal element attached to the first component, and sealingly contacting the second component; and
the bulb seal element attached to the spring seal element, and sealingly contacting the second component.

14. The assembly of claim 13, wherein the spring seal element comprises metal.

15. The assembly of claim 13, wherein the bulb seal element comprises elastomeric polymer.

16. The assembly of claim 13, wherein the spring seal element is configured within the gap as a heat shield for the bulb seal element.

17. The assembly of claim 13, wherein the spring seal element comprises a plurality of stacked feathered spring element bodies.

18. A seal assembly for sealing a gap formed by and extending between first and second components of an aircraft propulsion system, the seal assembly comprising a metal spring seal element and an elastomeric bulb seal element with a hollow inner bore, the metal spring seal element comprising a first portion and a second portion, the first portion configured to mount to the first component, the second portion configured to sealingly contact the second component, and the elastomeric bulb seal element mounted to the first portion and configured to sealing contact and be compressed against the second component, wherein the metal spring seal element is configured as a turkey feather seal element.

* * * * *

UNITED STATES PATENT AND TRADEMARK OFFICE
CERTIFICATE OF CORRECTION

PATENT NO. : 10,145,256 B2
APPLICATION NO. : 15/488935
DATED : December 4, 2018
INVENTOR(S) : Ratajac et al.

Page 1 of 1

It is certified that error appears in the above-identified patent and that said Letters Patent is hereby corrected as shown below:

In the Specification

Column 3, Line 65, please delete "aim" and insert --arm--.

Column 5, Line 62, please delete "aim" and insert --arm--.

In the Claims

Column 8, Line 27, Claim 18 please delete "sealing" and insert --sealingly--.

Signed and Sealed this
Ninth Day of April, 2019

Andrei Iancu
*Director of the United States Patent and Trademark Office*